(12) United States Patent
Lee et al.

(10) Patent No.: US 10,088,199 B2
(45) Date of Patent: Oct. 2, 2018

(54) COAXIAL GROUND HEAT EXCHANGER AND GROUND HEAT EXCHANGE SYSTEM INCLUDING THE SAME

(71) Applicant: KOREA INSTITUTE OF ENERGY RESEARCH, Daejeon (KR)

(72) Inventors: Dong-hyun Lee, Daejeon (KR); Byung-sik Park, Daejeon (KR); Chun Dong Park, Chungcheongbuk-do (KR); Yong-hoon Im, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 57 days.

(21) Appl. No.: 15/261,590

(22) Filed: Sep. 9, 2016

(65) Prior Publication Data

US 2018/0073778 A1    Mar. 15, 2018

(51) Int. Cl.
*F24J 3/08* (2006.01)
*F28D 7/02* (2006.01)
*F28D 20/00* (2006.01)

(52) U.S. Cl.
CPC .............. *F24J 3/084* (2013.01); *F28D 7/026* (2013.01); *F28D 20/0052* (2013.01)

(58) Field of Classification Search
CPC ........ F24J 3/084; F28D 7/026; F28D 20/0052

USPC ................ 165/45; 62/160, 260, 238.7, 324.1
See application file for complete search history.

(56) References Cited

U.S. PATENT DOCUMENTS

| | | | | |
|---|---|---|---|---|
| 4,930,484 A | * | 6/1990 | Binkley | ............... F02M 31/102 |
| | | | | 123/543 |
| 9,121,630 B1 | * | 9/2015 | Fraim | ..................... F25B 49/02 |
| 2007/0023163 A1 | * | 2/2007 | Kidwell | ................... F24J 3/084 |
| | | | | 165/45 |
| 2009/0025902 A1 | * | 1/2009 | Favier | ..................... F24J 3/083 |
| | | | | 165/45 |
| 2010/0218912 A1 | * | 9/2010 | Lawless | ................. C09K 8/467 |
| | | | | 165/45 |
| 2014/0299291 A1 | | 10/2014 | Stewart et al. | |
| 2015/0068740 A1 | | 3/2015 | Broder | |

* cited by examiner

*Primary Examiner* — Justin Jonaitis
(74) *Attorney, Agent, or Firm* — Dorsey & Whitney LLP

(57) ABSTRACT

Disclosed is a ground heat exchange system including a heat exchange pipe including a borehole surface and an inner pipe to be inserted into the borehole surface, and installed to penetrate the ground, a circulation pump configured to inject a fluid between the borehole surface and the inner pipe and discharge a heated fluid from the inner pipe, a heat exchanger configured to exchange heat using the fluid discharged from the inner pipe, and at least one wing portion disposed between the borehole surface and the inner pipe and configured to reduce heat transfer between a fluid flowing between the borehole surface and the inner pipe and a fluid flowing in the inner pipe.

16 Claims, 12 Drawing Sheets

US 10,088,199 B2

COAXIAL GROUND HEAT EXCHANGER AND GROUND HEAT EXCHANGE SYSTEM INCLUDING THE SAME

TECHNICAL FIELD

One or more example embodiments relate to a coaxial ground heat exchanger provided with a wing portion to reduce a heat transfer coefficient, and a ground heat exchange system including the coaxial ground heat exchanger.

BACKGROUND

A lack of fossil energy and a necessity for a reduction in air pollutants and carbon dioxide ($CO_2$) emissions may contribute to an increasing interest in generation of a heat source and use of technology using a substitute, for example, renewable energy, without pollutants.

Soil has nearly a consistent temperature although being approximately 10 meters (m) to 20 m below a ground surface. The temperature increases when a ground depth increases. A natural temperature gradient of the soil is approximately 0.03 Kelvin (K)/m relative to the depth, and the temperature is determined by a heat flux inside the earth.

In general, recovery of a heat source may be performed through circulation of a heat transfer medium. Here, a ground surface heat exchanger may be vertically installed 50 m to 350 m in depth and a deep ground heat exchanger may be installed 1,000 m to 5,000 m in depth.

In general, a traditional ground heat exchanger may be designed as a U-shaped tube exchanger including a U-shaped tube, and a heat transfer medium in such an exchanger may flow from a surface to a bottom of a hole of the exchanger at one point of the tube. That is, the heat transfer medium may flow from top to bottom.

At another point of the tube, a heated circulating heat transfer medium may flow from a borehole base to the surface. That is, the heat transfer medium may flow from bottom to top. When ascending, the heat transfer medium may release some of accumulated heat energy permanently towards a heat transfer medium circulating downwards at a neighboring point of the tube and towards a colder soil surrounding the tube. Due to such a heat release, exergetic efficiency of the U-shaped tube heat exchanger may not be relatively high.

To improve such an efficiency, a coaxial ground heat exchanger may be used. In a case of a coaxial ground heat exchanger in an annular outer gap, for example, a loop-shaped outer gap, a heat transfer medium may flow from a ground surface to a borehole base, and may obtain sensitive heat energy present in soil and then flow back towards the surface through a central core tube.

The heat transfer medium that is injected through an injection hole may absorb heat therearound while descending and thus be heated, and reach a highest temperature when arriving at a bottom of a ground heat hole. When the heat transfer medium is deprived of heat by the surroundings while ascending via a production hole, the heat transfer medium with a reduced temperature may be discharged out of the ground.

In such a coaxial ground heat exchanger when heat transfer of the central core tube is blocked, the exergetic efficiency may considerably increase.

The information included in this Background section of the specification, including any references cited herein and any description or discussion thereof, is included for technical reference purposes only and is not to be regarded subject matter by which the scope of the invention as defined in the claims is to be bound.

SUMMARY

According to example embodiments, a wing portion provided in an outer circumferential surface of a central core tube may enable a reduction in heat transfer of the central core tube.

According to example embodiments, setting an optimal value for an angle and a height of a wing portion may enable a reduction in heat transfer or heat conduction of an inner tube, and an increase in heat transfer or heat conduction of an outer tube.

According to an aspect, there is provided a coaxial ground heat exchanger including a borehole surface configured to absorb ground heat by a fluid flowing therein, a inner pipe disposed coaxially with the borehole surface and configured to externally discharge the fluid absorbing the ground heat, and at least one wing portion disposed on an outer circumferential surface of the inner pipe to reduce a heat transfer coefficient of the inner pipe.

The wing portion may slope in a direction in which a ground depth increases.

The wing portion may include at least one aperture and/or at least one small gap may be remained between the wing and the inner pipe to allow removing gases under the wing.

The wing portion may be provided in a plural number, and a plurality of wing portions may be disposed along a lengthwise direction of the borehole surface.

An angle between the wing portion and the outer circumferential surface of the inner pipe may be determined between 10 degrees (°) and 22.5°.

The wing portion may be extended from the outer circumferential surface of the inner pipe to an inner circumferential surface of the borehole surface.

The wing portion may occupy 10 percent (%) to 40% of a distance in a circumferential direction between the borehole surface and the inner pipe, based on a cross section between the borehole surface and the inner pipe.

The wing portion may have a slope that gradually decreases from an end portion of the wing portion that is connected to the inner pipe.

Another end portion, or an opposite end portion, of the wing portion may be bent towards the borehole surface.

According to another aspect, there is provided a ground heat exchange system including a heat exchange pipe including a borehole surface and a inner pipe to be inserted into the borehole surface, and provided to penetrate the ground, a circulation pump configured to inject a fluid between the borehole surface and the inner pipe and discharge a heated fluid from the inner pipe, a heat exchanger configured to exchange heat using the fluid discharged from the inner pipe, and at least one wing portion disposed between the borehole surface and the inner pipe, and configured to reduce heat transfer between a fluid flowing between the borehole surface and the inner pipe and a fluid flowing in the inner pipe.

An end portion of the wing portion may be connected to an outer circumferential surface of the inner pipe, and another end portion of the wing portion may be extended towards the borehole surface and the ground.

An angle between a lengthwise direction of the wing portion and an axial direction of the inner pipe may be determined between 10 degrees° and 22.5°.

A shortest distance between the other end portion of the wing portion and the outer circumferential surface of the inner pipe may be 10% to 40% of a distance in a circumferential direction between the borehole surface and the inner pipe.

The wing portion may be in a form of a truncated cone surrounding the inner pipe, and the wing portion may include at least one hole and/or at least one small gap may be remained between the wing and the inner pipe.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The aspects, features, and advantages of the present disclosure will become apparent and more readily appreciated when taken in conjunction with the accompanying drawings.

DETAILED DESCRIPTION

Figure 1:
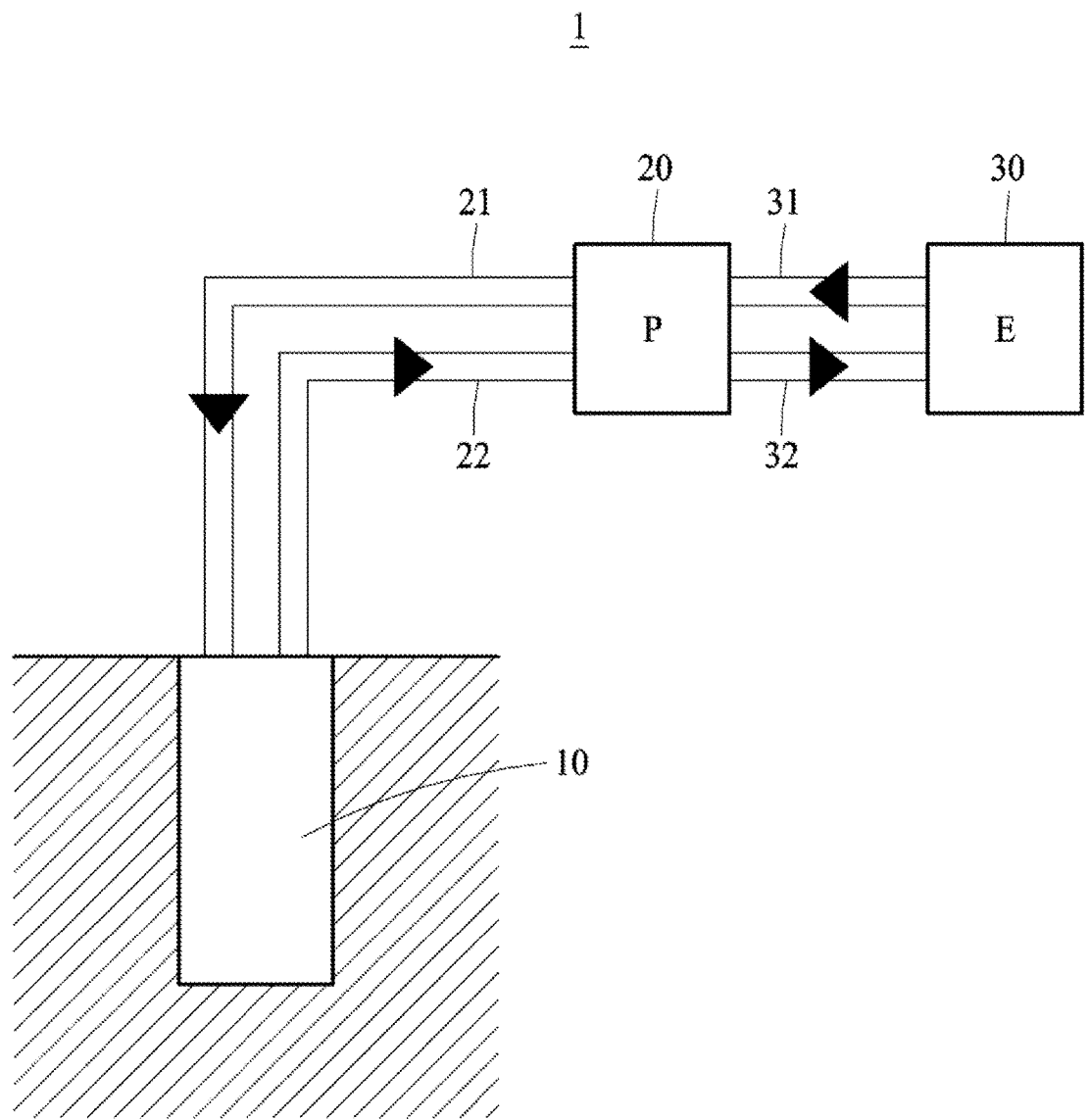
FIG. 1 is a diagram illustrating a structure of a ground heat exchange system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

FIG. 1 is a diagram illustrating a structure of a ground heat exchange system 1 according to an example embodiment.

Referring to FIG. 1, the ground heat exchange system 1 includes a ground heat exchanger 10 configured to pull heat out of the ground through heat exchange with the ground, a circulation pump (P) 20 configured to inject a fluid into the ground heat exchanger 10 and externally discharge a heated fluid, and a heat exchanger (E) 30 configured to exchange heat using the fluid discharged from the ground heat exchanger 10.

The ground heat exchanger 10 is inserted deeply in the ground from a ground surface. The circulation pump 20 injects the fluid into the ground heat exchanger 10 through a supply pipe 21 and discharge the heated fluid from the ground heat exchanger 10 through a discharge pipe 22.

The heat exchanger 30 absorbs heat from the heated fluid to use the heat for another purpose, for example, for electricity generation, and supplies a fluid from which the heat is discharged to the circulation pump 20. The heat exchanger 30 receives the heated fluid from the circulation pump 20 through an inflow pipe 32, and discharge the cold fluid into the circulation pump 20 through an outflow pipe 31.

Using the ground heat exchanger 10, which is also referred to as a coaxial ground heat exchanger 10, ground heat may be obtained with a single borehole.

Figure 2:
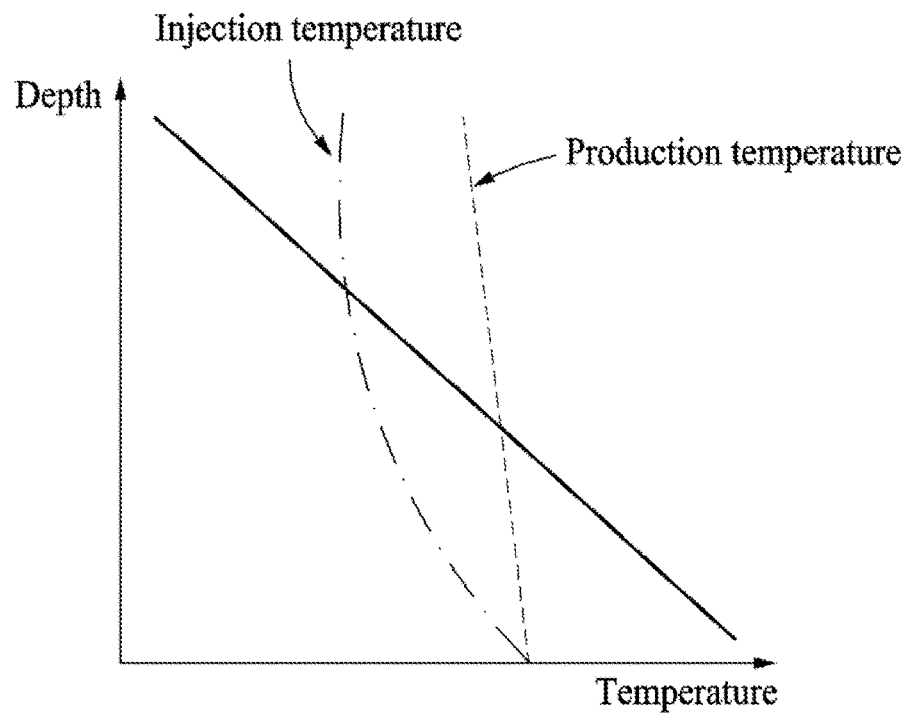
FIG. 2 is a graph illustrating a relationship between an injection temperature of a fluid used for a ground heat exchange system and a production temperature of the fluid according to an example embodiment.

FIG. 2 is a graph illustrating a relationship between an injection temperature of a fluid used for the ground heat exchange system 1 and a production temperature of the according to an example embodiment.

In the coaxial ground heat exchanger 10, an injection hole and a production hole are disposed close to each other. A temperature of circulation water that is injected through the injection hole gradually increases while the water is flowing into the ground and reaches a maximum temperature at a deepest location, and then the water is deprived of heat by an external flow path while ascending through the production hole, and thus heat loss may occur. Thus, the production temperature, a temperature produced, may be lower compared to the maximum temperature.

In a case of ground heat occurring at a location adjacent to a ground surface, an amount of heat loss may be reduced or minimized using a method of, for example, providing, as a vacuum tube, an inner vacuum pipe between the injection hole and the production hole. However, in a case of a deep ground heat occurring at a deepest location of the ground, the vacuum tube may not be readily applicable because a pressure of a fluid reaches 100 atmospheric pressure (atm) to 500 atm.

Thus, the coaxial ground heat exchanger 10 described herein may include a wing portion provided along an outer circumferential surface of the production hole to minimize heat transfer between the injection hole and the production hole, and to form a structure of a flow path that improves heat transfer of an outer wall.

Figure 3:
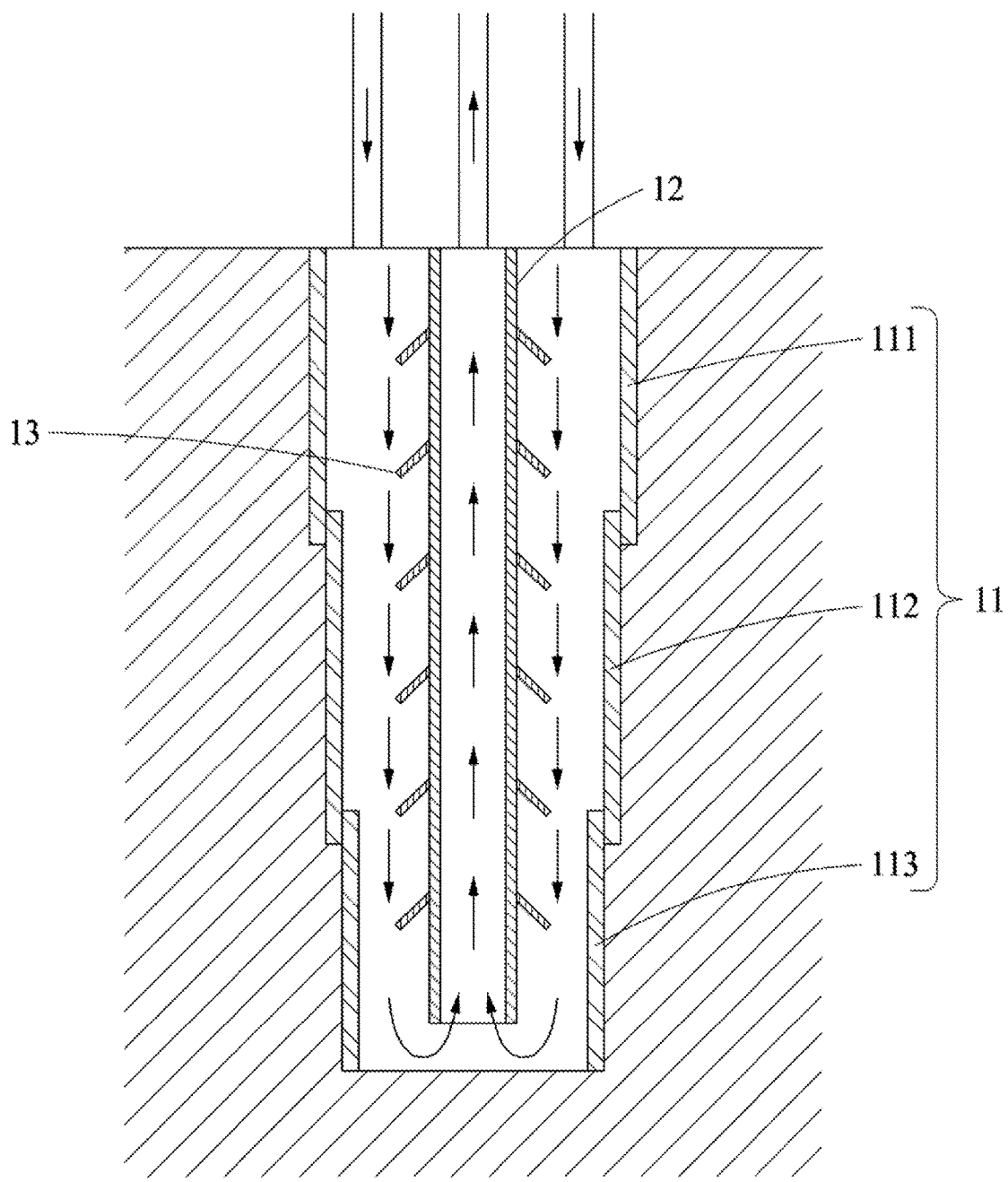
FIG. 3 is a cross-sectional view of a ground heat exchanger according to an example embodiment.

FIG. 3 is a cross-sectional view of the ground heat exchanger 10 according to an example embodiment.

Referring to FIG. 3, the coaxial ground heat exchanger 10 includes a borehole surface 11 supported by an underground sidewall and configured to absorb ground heat by a fluid flowing in a space between the borehole surface 11 and a inner pipe 12, the inner pipe 12 disposed coaxially with the borehole surface 11 in the borehole surface 11 and configured to externally discharge the fluid absorbing the ground heat, and at least one wing portion 13 disposed in an outer circumferential surface of the inner pipe 12 to reduce a heat transfer coefficient of the inner pipe 12.

The borehole surface 11 includes a plurality of portions, for example, a portion 111, a portion 112, and a portion 113, and a portion with a smaller diameter may be disposed at a deeper location of the ground. That is, a diameter may decrease from an upper portion, for example, the portion 111, towards a lower portion, for example, the portion 113.

The fluid may be injected into the space between the borehole surface 11 and the inner pipe 12, and the space may function as an injection hole. In addition, a heated fluid may be discharged into a space in the inner pipe 12, and the space may function as a production hole.

A lower end of the borehole surface 11 is closed, and a lower end of the inner pipe 12 is opened. Thus, the heated fluid may ascend from a lower end between the borehole surface 11 and the inner pipe 12 to the space in the inner pipe 12.

The wing portion 13 may slope downwards as illustrated in FIG. 3, for example, in a direction in which a ground depth increases. The wing portion 13 may be provided in a plural number, and a plurality of wing portions may be disposed along a lengthwise direction of the inner pipe 12. The wing portion 13 may reduce heat conductivity throughout an entire lengthwise direction of the inner pipe 12.

The wing portion 13 is distinguished from a heat transfer plate that is installed in a general heat exchanger. The heat transfer plate may increase a size of a contact area between two heat exchange media and improve a heat exchange efficiency of the heat exchanger. In contrast, as described hereinafter, the wing portion 13 may provide an insulation using a characteristic of a flow of a fluid used.

Figure 4:
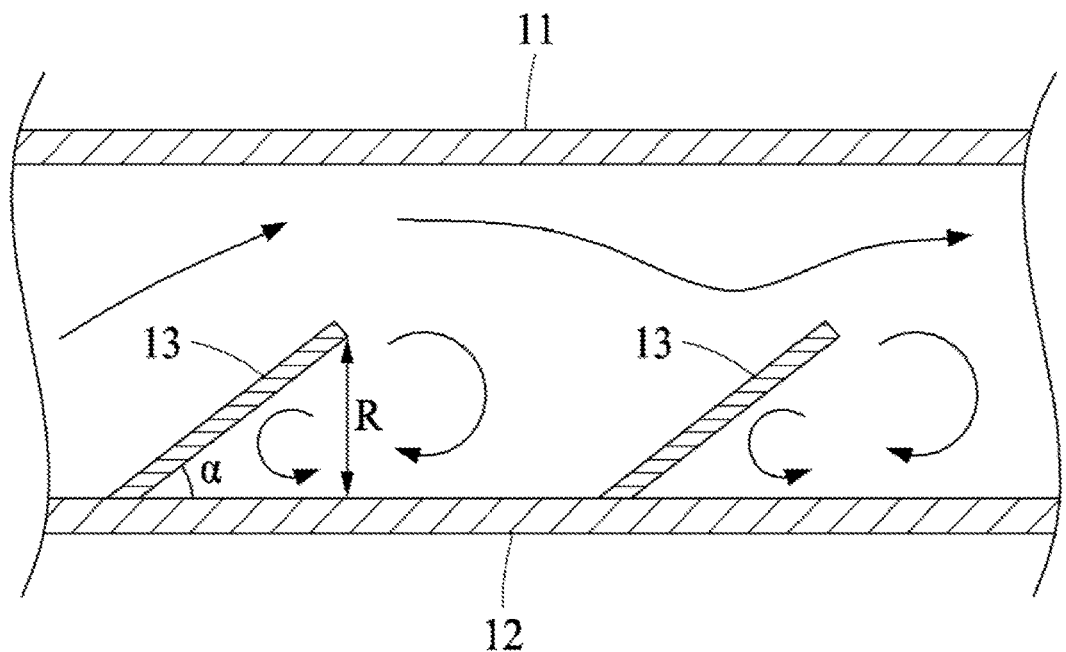
FIG. 4 is an enlarged view of a wing portion of a ground heat exchanger according to an example embodiment.
Figure 5:
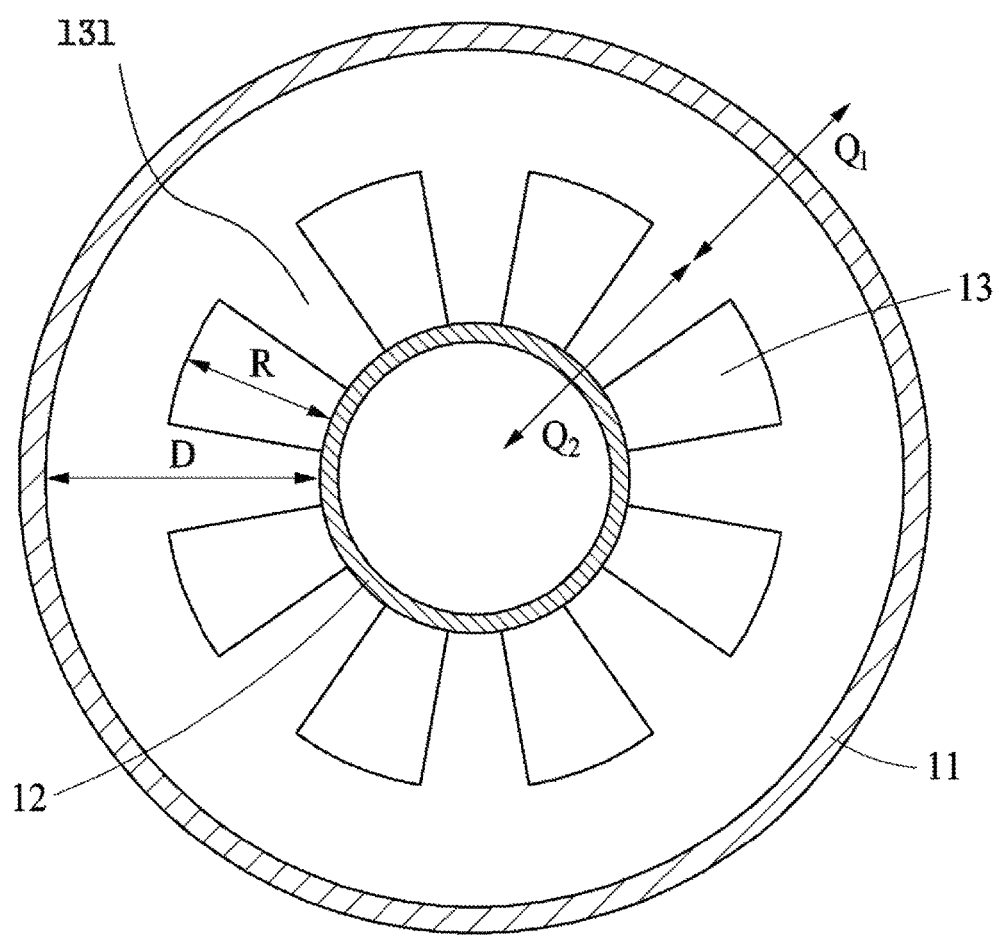
FIG. 5 is a cross-sectional view of a ground heat exchanger cut vertically to a lengthwise direction of the ground heat exchanger according to an example embodiment.

FIG. 4 is an enlarged view of the wing portion 13 of the ground heat exchanger 10 according to an example embodiment. FIG. 5 is a cross-sectional view of the ground heat exchanger 10 cut vertically to a lengthwise direction of the ground heat exchanger 10 according to an example embodiment.

One end portion of the wing portion 13 is connected to an outer circumferential surface of the inner pipe 12, and another end portion, or an opposite end portion, of the wing portion 13 is extended towards an inner circumferential surface of the borehole surface 11.

The other end portion of the wing portion 13 is spaced apart from the outer circumferential surface of the inner pipe 12 to have a distance R. Depending on the distance R to be determined, heat conductivity between an outer side and an inner side of the inner pipe 12 may vary. The distance R may also be referred to as a height of the wing portion 13.

The wing portion 13 is formed to have an angle α with the outer circumferential surface of the inner pipe 12. Depending on the angle α to be determined, the heat conductivity between the outer side and the inner side of the inner pipe 12 may vary.

For example, a plurality of trapezoid-shaped wing portions may be provided as the wing portion 13 along a circumference of the outer circumferential surface of the inner pipe 12, and may be disposed with regular gaps therebetween.

When the wing portion 13 is provided, in a space between the wing portion 13 and the outer circumferential surface of the inner pipe 12, a recirculation area of a fluid in which the fluid turns round at a same location as illustrated in FIG. 4, irrespective of a flow of the fluid flowing between the inner circumferential surface of the borehole surface 11 and the outer circumferential surface of the inner pipe 12, may be formed to perform a function of insulation. Thus, heat transfer Q2 between the outer side and the inner side of the inner pipe 12 may be reduced.

In addition, a space between an outer surface of the wing portion 13 and the inner circumferential surface of the borehole surface 11 may decrease, and a flow speed may thus increase. Thus, a fluid movement accelerated by the wing portion 13 may collide with the inner circumferential surface of the borehole surface 11, and thus heat transfer Q1 between an inner side and an outer side of the borehole surface 11 may be improved.

For a smooth flow of a fluid flowing between the borehole surface 11 and the inner pipe 12, the wing portion 13 includes at least one aperture 131. For example, the wing portion 13 may be connected to the inner surface of inner pipe 12 by a spot welding, the aperture 131 may form a space between the adjacent two wing portions 13. In this case, the aperture can be a slot type.

Figure 6A:
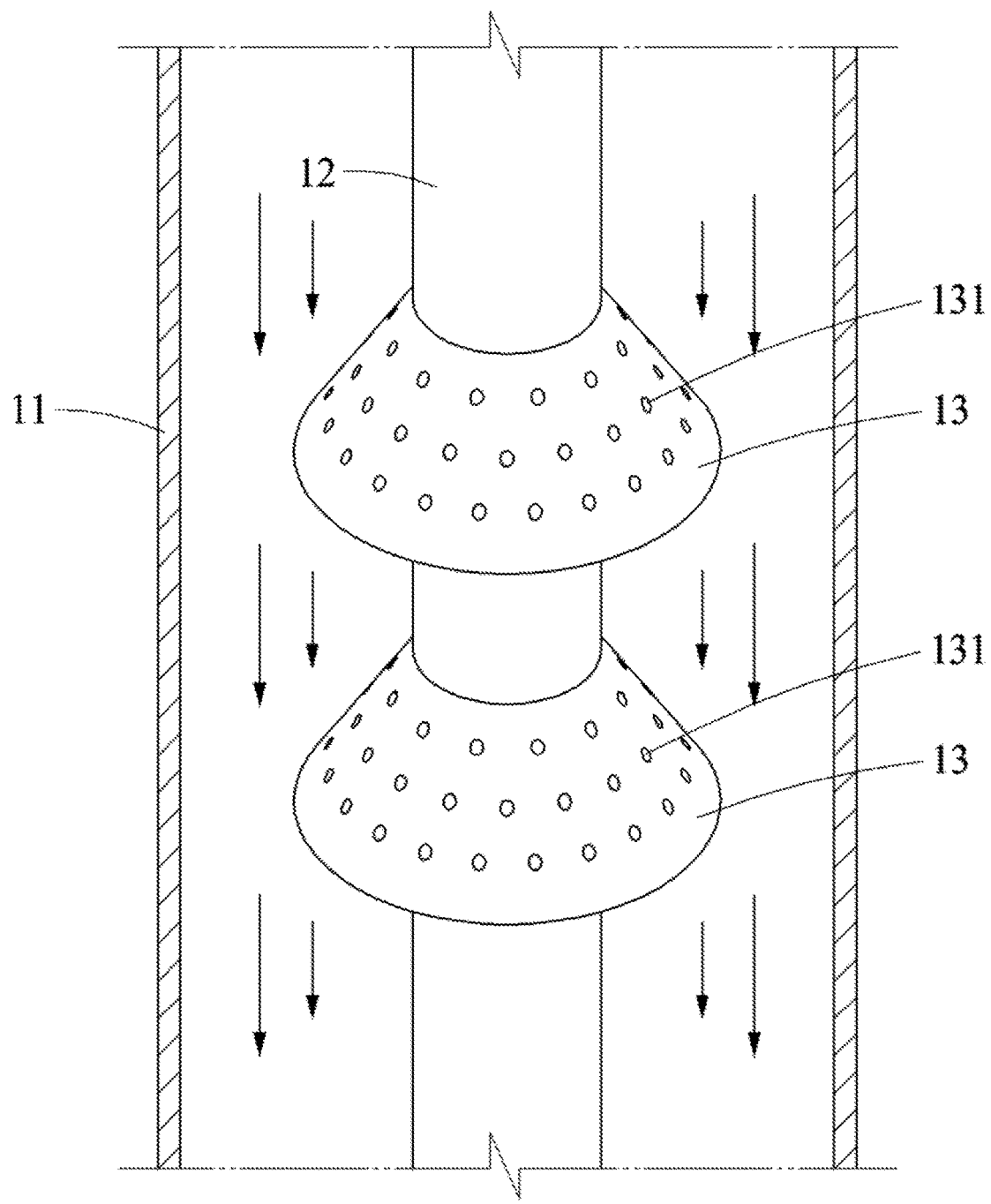
FIG. 6A is a perspective view of an example of a modified wing portion according to an example embodiment.

FIG. 6A is a perspective view of an example of a modification to the wing portion 13 according to an example embodiment.

Referring to FIG. 6A, the wing portion 13 is provided in a form that surrounds an entire circumferential surface of the inner pipe 12, dissimilar to the form of the wing portion 13 illustrated in FIG. 5. For example, the wing portion 13 may be provided in a form of a truncated cone, and the plurality of apertures 131, such as a hole type, are provided in the surface of wing portion 13.

Figure 6B:
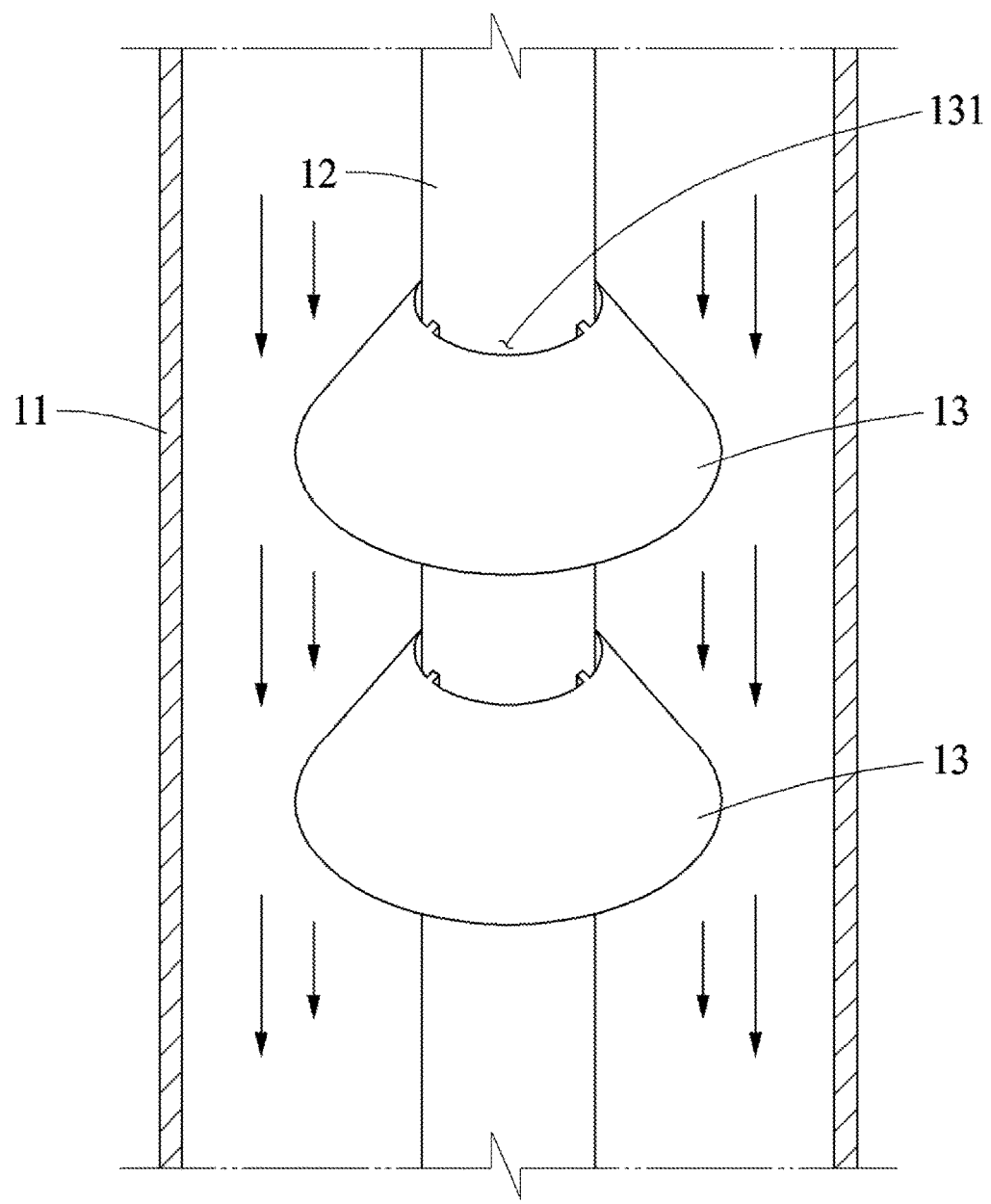
FIG. 6B is a perspective view of another example of a modified wing portion according to an example embodiment.

FIG. 6B is a perspective view of another example of a modification to the wing portion 13 according to an example embodiment.

Referring to FIG. 6B, the wing portion 13 may be spot welded to the inner pipe 12. For example, the wing portion 13 may be fixed to the inner pipe 12 through spot welding by which two to four spots of the wing portion 13 may be welded in a circumferential direction along the inner pipe 12. In such an example, a gap may be formed between portions that are not welded between the wing portion 13 and the inner pipe 12, and air may escape through the gap. Such a structure described in the foregoing may prevent an air pocket that may be formed in a lower side of the wing portion 13. Further, a size of a contact area between the wing portion 13 and the inner pipe 12 may be minimized, and thus heat loss by conduction may be prevented.

The aperture 131 may be used to prevent an air pocket from being formed in a space formed between an inner side of the wing portion 13 and the outer circumferential surface of the inner pipe 12 when the inner pipe 12 is inserted while the borehole surface 11 is being filled with a fluid. Thus, an issue of the inner pipe 12 being lifted or drifted due to buoyancy by the air pocket may be prevented, and thus the inner pipe 12 may be readily inserted. FIGS. 7A through 7D are cross-sectional views of various shapes of the wing portion 13 according to an example embodiment.

Figure 7A:
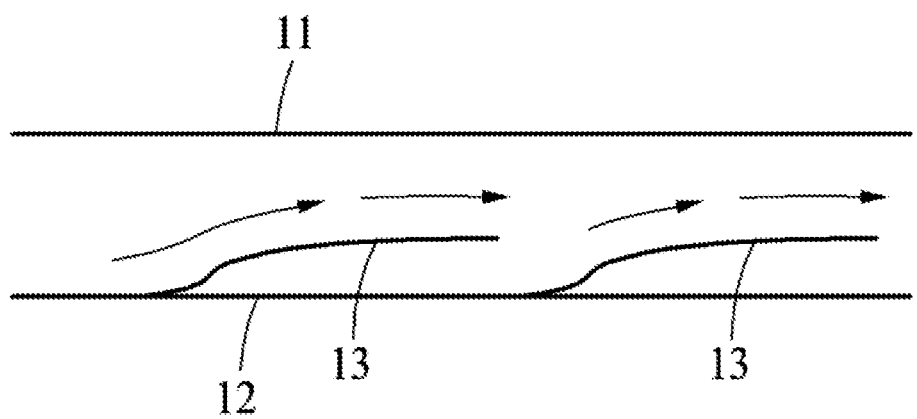
FIGS. 7A through 7D are cross-sectional views of various shapes of a wing portion according to an example embodiment.

Referring to FIG. 7A, the wing portion 13 may be provided in an overall streamlined shape. In such a shape, an issue of a pressure drop that may occur when a fluid collides with the wing portion 13 may be reduced. For example, an overall slope may decrease from one end portion of the wing portion 13 being extended towards another end portion of the wing portion 13. Thus, such a shape may allow a fluid movement flowing along an outer circumferential surface of the wing portion 13 to be smoother.

Figure 7B:
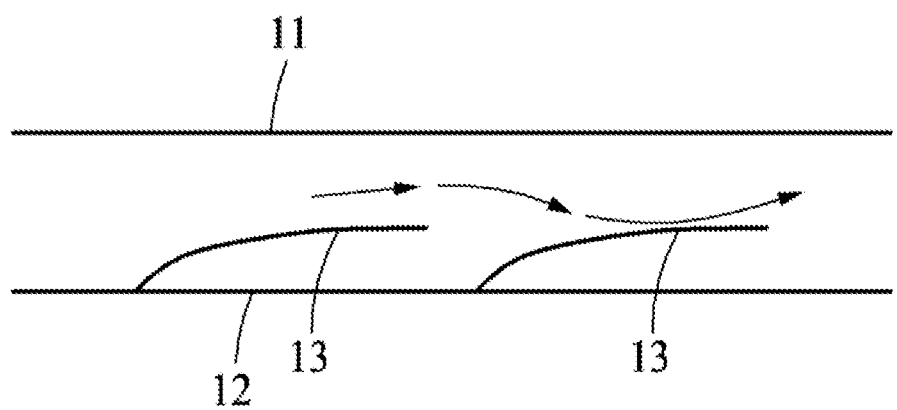
Figure 7C:
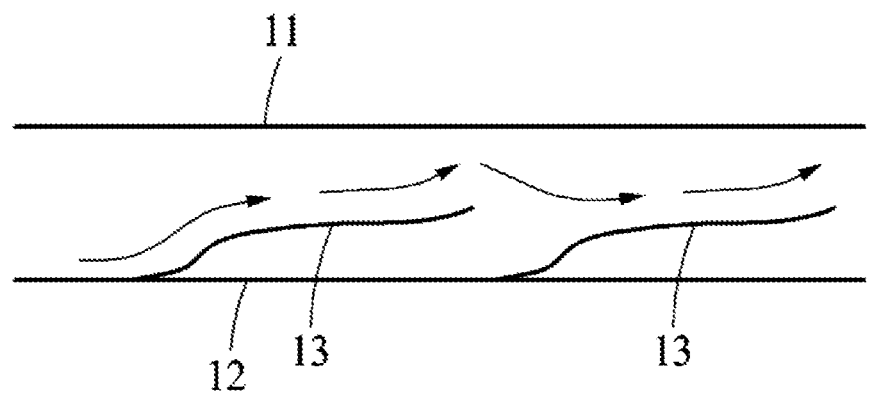

Referring to FIG. 7B, a first end portion of the wing portion 13 that is connected to the inner pipe 12 may have a low slope. That is, the first end portion of the wing portion 13 may have a slope gradually decreasing towards the inner pipe 12. In such a shape, an issue of a pressure drop that may occur when a fluid flowing along the outer circumferential surface of the inner pipe 12 collides with one end of the wing portion 13 may be reduced. For example, as illustrated in FIG. 7B, a slope of the wing portion 13 may increase when being farther from the inner pipe 12, and then decrease again in a middle portion. That is, the slope of the wing portion 13 may change twice. Referring to FIG. 7C, a second end portion of the wing portion 13 that is farthest from the inner pipe 12 may be extended towards the inner circumferential surface of the borehole surface 11. That is, the second end portion of the wing portion 13 may have a slope increasing when the second end portion is disposed farther from the inner pipe 12. In such a shape, a fluid flowing along the wing portion 13 may strongly flow towards the inner circumferential surface of the borehole surface 11, and thus a heat transfer, or a heat transfer rate, with the borehole surface 11 may be improved. In addition, a separation point of the fluid flowing along the wing portion 13 may be delayed, and thus a mixture of the fluid and a fluid in a recirculation area formed in the inner side of the wing portion 13 may be effectively prevented. For example, as illustrated in FIG. 7C, a slope of the wing portion 13 may decrease when the wing portion 13 is farther from the inner pipe 12, and then increase in the second end portion. That is, the slope of the wing portion 13 may change twice.

Figure 7D:
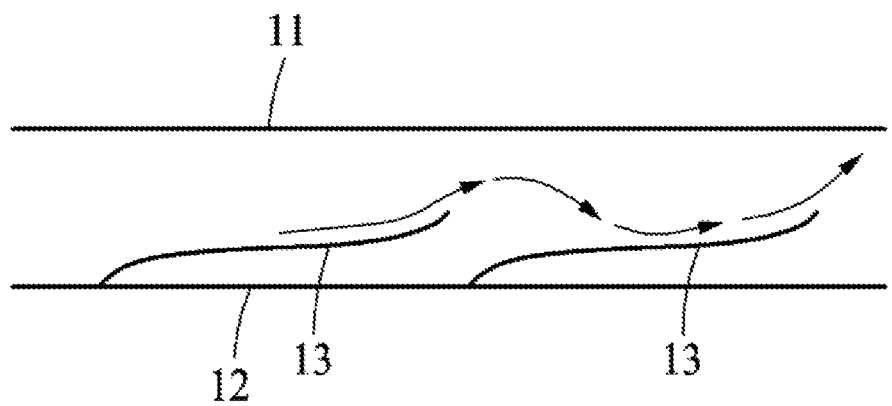

Referring to FIG. 7D, a first end portion of the wing portion 13 may have a low slope, and a second end portion of the wing portion 13 may be extended towards the inner circumferential surface of the borehole surface 11. Such a shape may be effective as described in the foregoing. For example, as illustrated in FIG. 7D, a slope of the wing portion 13 may increase from the first end portion when the wing portion 13 is farther from the inner pipe 12, decrease again in a middle portion, and then increase again in the second end portion. That is, the slope of the wing portion 13 may change three times.

Figure 8A:
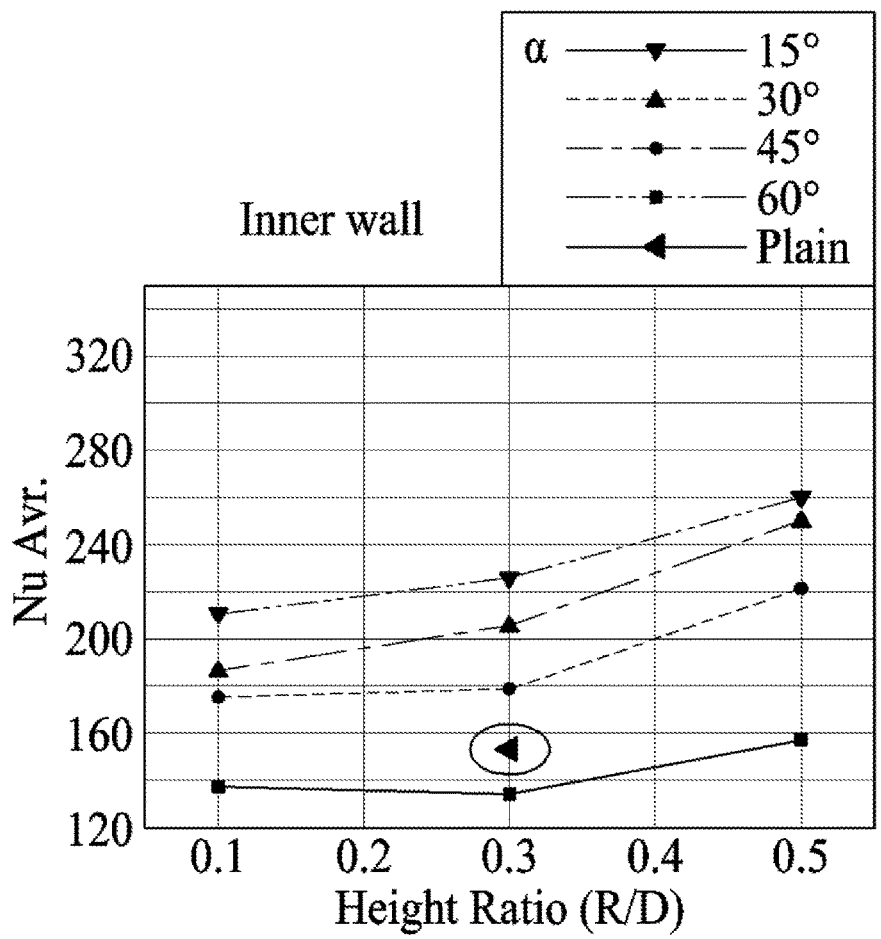
FIGS. 8A and 8B are graphs illustrating a change in heat transfer coefficient based on a shape of a wing portion of a ground heat exchanger according to an example embodiment.
Figure 8B:
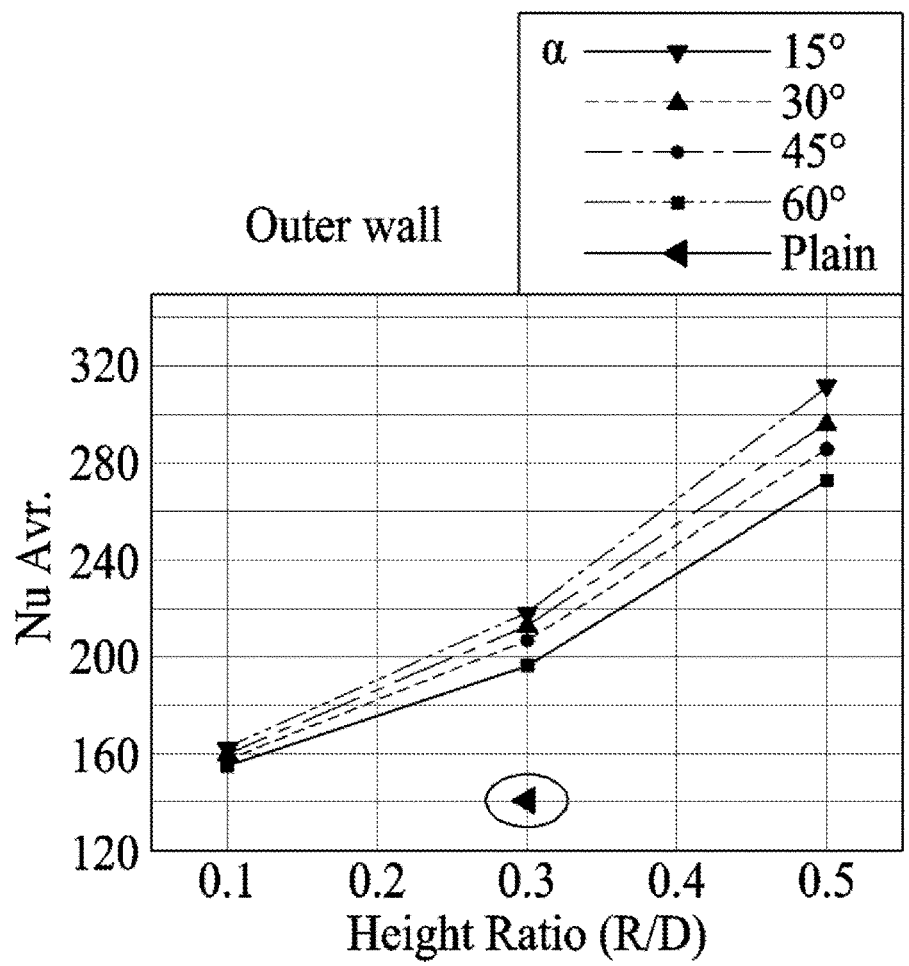

FIGS. 8A and 8B are graphs illustrating a change in heat transfer coefficient based on a shape of the wing portion 13 of the ground heat exchanger 10 according to an example embodiment.

Referring back to FIGS. 4 and 5, a parameter for determining a shape of the wing portion 13 may include a ratio R/D of a distance (R) between the other end portion of the wing portion 13 and the outer circumferential surface of the inner pipe 12 to a distance D in a circumferential direction between the inner circumferential surface of the borehole surface 11 and the outer circumferential surface of the inner pipe 12, and include an angle α formed between the wing portion 13 and the outer circumferential surface of the inner pipe 12.

Referring to FIG. 8A, a graph illustrated in an upper portion of FIG. 8A indicates a heat conductivity between an outer side and an inner side of the inner pipe 12 based on the ratio R/D. A table illustrated in a lower portion of FIG. 8A indicates simulation values of the heat conductivity to draw the graph.

Here, it may be desirable that a measured value of the heat conductivity is lower for the heat conductivity between the outer side and the inner side of the inner pipe 12.

Referring to the graph in FIG. 8A, a circled point indicates a point at which a heat conductivity is measured when the wing portion 13 is not provided. In an absence of the wing portion 13, the heat conductivity between the outer side and the inner side of the inner pipe 12, which is described as 'plain coaxial' in FIG. 8A, is measured to be 152.02 in Nusselt number (Nu).

Referring to the graph in FIG. 8A, when the angle α decreases, the heat conductivity decreases. That is, when the wing portion 13 is formed to be closer, or flatter, to the outer circumferential surface of the inner pipe 12, the heat conductivity may decrease.

In addition, when the ratio R/D decreases, the heat conductivity decreases. That is, when a degree of extension of the wing portion 13 towards the outer circumferential surface of the borehole surface 11 from the inner circumferential surface of the inner pipe 12 is lower, the heat conductivity decreases.

Referring to the table in FIG. 8A, when the angle α is 15° and the ratio R/D is 0.1 and 0.3, the heat conductivity may be lower than the heat conductivity in the absence of the wing portion 13.

As a simulation result shown in FIG. 8A, when the angle α between the wing portion 13 and the outer circumferential surface of the inner pipe 12 is determined to be between 10° and 22.5°, and the radio R/D of the distance R, or a shortest length, between the other end portion of the wing portion 13 and the outer circumferential surface of the inner pipe 12 to the distance D in the circumferential direction between the inner circumferential surface of the borehole surface 11 and the outer circumferential surface of the inner pipe 12 is determined to be 0.1 to 0.4, the heat conductivity between the inner side and the outer side of the inner pipe 12 may effectively decrease.

Referring to FIG. 8B, a graph illustrated in an upper portion of FIG. 8B indicates a heat conductivity between an outer side and an inner side of the borehole surface 11 based on the ratio R/D. A table illustrated in a lower portion of FIG. 8B indicates simulation values of the heat conductivity to draw the graph.

Here, it may be desirable that a measured value of the heat conductivity is higher for the heat conductivity between the outer side and the inner side of the borehole surface 11.

Referring to the graph in FIG. 8A, a circled point indicates a point at which a heat conductivity is measured when the wing portion 13 is not provided. In an absence of the wing portion 13, the heat conductivity between the outer side and the inner side of the borehole surface 11, which is described as 'plain coaxial' in FIG. 8B, is measured to be 140.02 Nu.

As a simulation result shown in FIG. 8B, irrespective of the angle α and the radio R/D, the heat conductivity may increase when the wing portion 13 is provided, compared to the heat conductivity in the absence of the wing portion 13.

A fluid movement towards the borehole surface 11 may increase by the wing portion 13, and thus the number of times a fluid comes into contact with the inner circumferential surface of the borehole surface 11 may increase.

Figure 9:
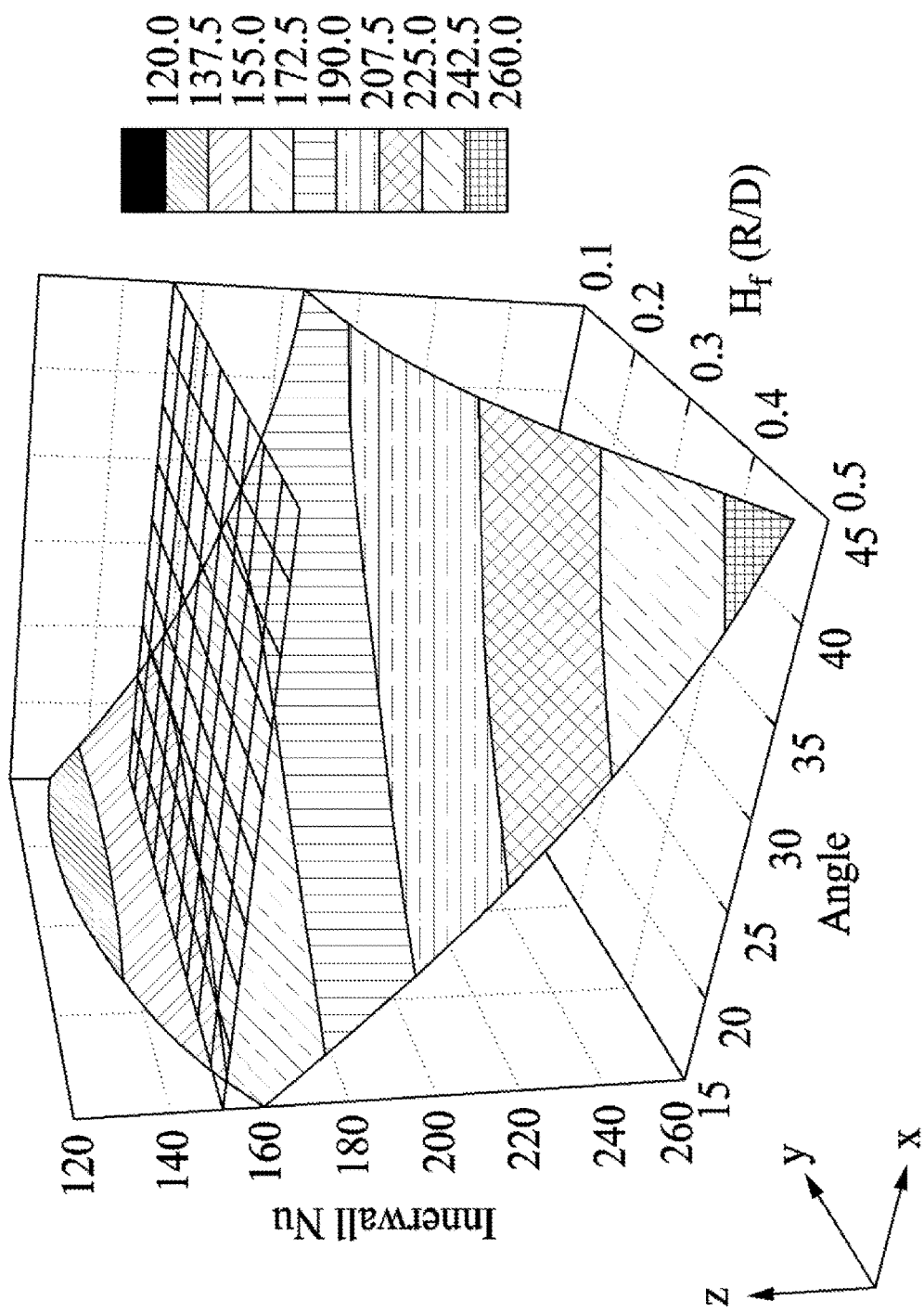
FIG. 9 is a graph illustrating a suitable angle of a wing portion of a ground heat exchanger according to an example embodiment.

FIG. 9 is a graph obtained by expanding a simulation associated with FIG. 8A.

In the graph of FIG. 9, based on a coordinate system, an x axis indicates the angle α, a y axis indicates the ratio R/D, and a z axis indicates the heat conductivity between the inner side and the outer side of the inner pipe 12. In each axis, a value may decrease in an arrow-indicating direction.

A boundary surface in a mesh form indicates a heat conductivity in the absence of the wing portion 13, 152.02 Nu, as illustrated in FIG. 8A. Thus, a portion located upper than the boundary surface corresponds to a case in which the heat conductivity is lower than the heat conductivity in the absence of the wing portion 13. Thus, the wing portion 13 may have an angle α and a ratio R/D corresponding to the portion located upper than the boundary surface.

For example, when the ratio R/D is less than or equal to 0.5 and the angle α associated with the wing portion 13 is less than or equal to 22.5°, the heat conductivity may be lower than the heat conductivity in the absence of the wing portion 13.

Thus, it may be desirable to determine the angle α to be 10° to 22.5° or less in order to lower the heat conductivity between the inner side and the outer side of the inner pipe 12.

Figure 10:
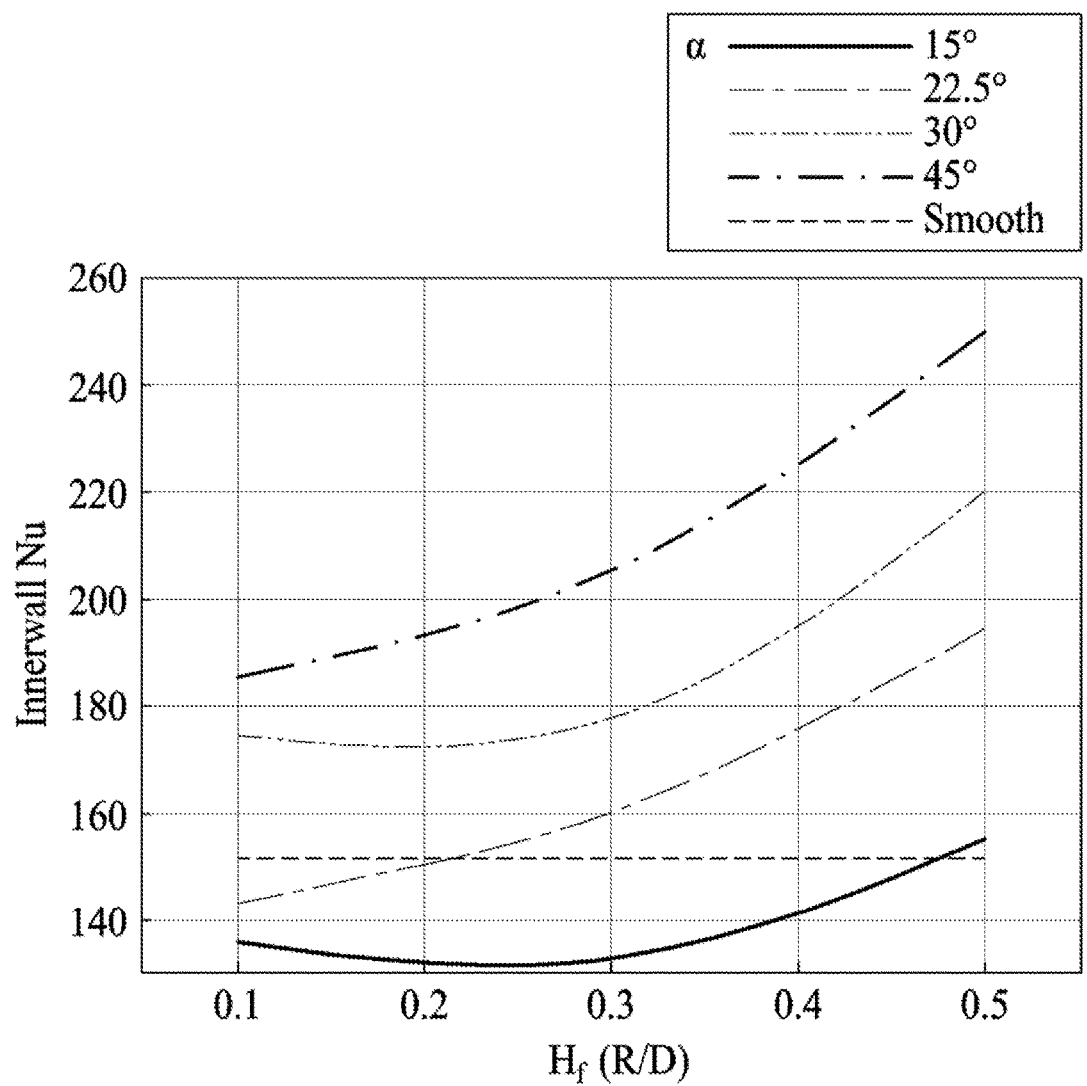
FIG. 10 is a graph illustrating a suitable height of a wing portion of a ground heat exchanger according to an example embodiment.

FIG. 10 is a graph illustrating a suitable ratio R/D of the wing portion 13 of the ground heat exchanger 10 according to an example embodiment. In the graph of FIG. 10, an x axis indicates a ratio R/D and a y axis indicates a heat conductivity between the inner side and the outer side of the inner pipe 12.

Each line drawn in the graph of FIG. 10 indicates a heat conductivity based on a ratio R/D when the wing portion 13 has a certain angle α.

A smooth line indicates the heat conductivity 152.02 Nu in the absence of the wing portion 13 as illustrated in FIG. 8A. Thus, a portion located lower than the smooth line may correspond to a case in which a heat conductivity is lower than the heat conductivity in the absence of the wing portion 13.

A solid line indicating that the angle α is 15° indicates that a heat conductivity when a ratio R/D is less than or equal to 0.4 is less than or equal to the heat conductivity in the absence of the wing portion 13. Thus, it may be desirable to determine the ratio R/D to be 0.1 to 0.4 or less in order to reduce the heat conductivity.

According to example embodiments, installing a plurality of wing portions in an outer circumferential surface of an inner tube may enable a reduction in heat transfer or heat conduction of the inner tube.

According to example embodiments, setting an optimal value for an angle and a height of a wing portion may enable a reduction in heat conduction of an inner tube and an increase in heat conduction of an outer tube.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A coaxial ground heat exchanger, comprising:
   a borehole surface configured to absorb ground heat by a fluid flowing therein;
   an inner pipe disposed coaxially with the borehole surface in the borehole surface and configured to externally discharge the fluid absorbing the ground heat; and
   at least one wing portion disposed on an outer circumferential surface of the inner pipe to reduce a heat transfer coefficient of the inner pipe, wherein
   the inner pipe is disposed vertically to the ground;
   the at least one wing portion slopes downward in an outward direction from the inner pipe to an inner circumferential surface of the borehole surface;
   the at least one wing portion is configured to provide a recirculation area of the fluid in which the fluid turns around at a same location; and
   the recirculation area performs a function of insulation.

2. The coaxial ground heat exchanger of claim 1, wherein a gap is formed between the inner pipe and the wing portion.

3. The coaxial ground heat exchanger of claim 2, wherein the wing portion is provided in a plural number, and a plurality of wing portions are disposed along a lengthwise direction of the borehole surface and spaced apart from one another.

4. The coaxial ground heat exchanger of claim 3, wherein the wing portion is extended from the outer circumferential surface of the inner pipe to an inner circumferential surface of the borehole surface.

5. The coaxial ground heat exchanger of claim 1, wherein the wing portion comprises at least one hole to prevent an air pocket from being formed between an inner wall of the wing portion and the outer circumferential surface of the inner pipe.

6. The coaxial ground heat exchanger of claim 1, wherein an angle between the wing portion and the outer circumferential surface of the inner pipe is 10 degrees (°) to 22.5°.

7. The coaxial ground heat exchanger of claim 6, wherein a height of the wing portion is 10 percent (%) to 40% of a distance in a circumferential direction between the borehole surface and the inner pipe.

8. The coaxial ground heat exchanger of claim 6, wherein the wing portion is streamlined, having a slope that gradually decreases from an end portion of the wing portion connected to the inner pipe.

9. The coaxial ground heat exchanger of claim 8, wherein another end portion of the wing portion is bent towards the borehole surface.

10. A ground heat exchange system, comprising:
a borehole surface supported by an underground sidewall, and the borehole is drilled into the ground;
an inner pipe to be inserted into the borehole surface;
a circulation pump configured to inject a fluid between the borehole surface and the inner pipe, and discharge a heated fluid from the inner pipe;
a heat exchanger configured to exchange heat using the fluid discharged from the inner pipe; and
at least one wing portion disposed between the borehole surface and the inner pipe, and configured to reduce heat transfer between a fluid flowing between the borehole surface and the inner pipe and a fluid flowing in the inner pipe, wherein
the inner pipe is disposed vertically to the ground;
a first end portion of the wing portion is connected to an outer circumferential surface of the inner pipe;
a second end portion of the wing portion slopes downward in an outward direction from the inner pipe to an inner circumferential surface of the borehole surface;
the at least one wing portion is configured to provide a recirculation area of the fluid in which the fluid turns around at a same location; and
the recirculation area performs a function of insulation.

11. The ground heat exchange system of claim 10, wherein an angle between a lengthwise direction of the wing portion and an axial direction of the inner pipe is 10 degrees (°) to 22.5°.

12. The ground heat exchange system of claim 10, wherein a height of the wing portion is 10 percent (%) to 40% of a distance in a circumferential direction between the borehole surface and the inner pipe.

13. The ground heat exchange system of claim 10, wherein a slope of the first end portion of the wing portion gradually decreases, where the first end portion is disposed closer to the inner pipe.

14. The ground heat exchange system of claim 10, wherein a slope of the second end portion of the wing portion gradually increases, where the second end portion is disposed farther from the inner pipe.

15. The ground heat exchange system of claim 10, wherein a slope of the wing portion changes three times.

16. A ground heat exchange system comprising
a borehole surface supported by an underground sidewall, and the borehole is drilled into the ground;
an inner pipe to be inserted into the borehole surface;
a circulation pump configured to inject a fluid between the borehole surface and the inner pipe, and discharge a heated fluid from the inner pipe;
a heat exchanger configured to exchange heat using the fluid discharged from the inner pipe; and
at least one wing portion disposed between the borehole surface and the inner pipe, and configured to reduce heat transfer between a fluid flowing between the borehole surface and the inner pipe and a fluid flowing in the inner pipe, wherein
the wing portion is in a form of a truncated cone surrounding the inner pipe, and the wing portion comprises at least one hole.

* * * * *